(12) United States Patent
Dinan

(10) Patent No.: US 11,395,173 B2
(45) Date of Patent: *Jul. 19, 2022

(54) FIRST AND SECOND UNLICENSED CELLS JOINTLY SERVING AS REFERENCE CELLS

(71) Applicant: Ofinno, LLC, Reston, VA (US)

(72) Inventor: Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/992,186

(22) Filed: Aug. 13, 2020

(65) Prior Publication Data

US 2020/0374737 A1 Nov. 26, 2020

Related U.S. Application Data

(63) Continuation of application No. 15/417,796, filed on Jan. 27, 2017, now Pat. No. 10,750,391.

(Continued)

(51) Int. Cl.
  *H04W 24/10* (2009.01)
  *H04W 72/04* (2009.01)
  (Continued)

(52) U.S. Cl.
  CPC .......... *H04W 24/10* (2013.01); *H04L 5/0048* (2013.01); *H04W 48/16* (2013.01);
  (Continued)

(58) Field of Classification Search
  CPC .................................................. H04W 24/10
  See application file for complete search history.

(56) References Cited

U.S. PATENT DOCUMENTS 9,301,287 B2  3/2016 Seo et al.
2013/0114574 A1  5/2013 Ng et al.
(Continued)

FOREIGN PATENT DOCUMENTS

WO  WO-2016122112 A1 * 8/2016 ........... H04B 17/309

OTHER PUBLICATIONS

WO-2016122112-A1 English Translation (Year: 2016).*
3GPP TR 36.889 V1.0.1 (Jun. 2015); 3rd Generation Partnership Project; Technical Specification Group Radio Access Network; Study on Licensed-Assisted Access to Unlicensed Spectrum; (Release 13).

(Continued)

*Primary Examiner* — Kodzovi Acolatse
*Assistant Examiner* — Abdeltif Ajid
(74) *Attorney, Agent, or Firm* — Sachin Kandhari; Kavon Nasabzadeh; Philip R. Smith

(57) ABSTRACT

A wireless device receives configuration parameters of licensed primary cell(s) of a primary TAG; and a first and a second unlicensed secondary cells, of a secondary TAG. Both the first and second unlicensed secondary cells are selected to jointly serve as reference cells for pathloss measurement of the second unlicensed secondary cell. The selection is based on the first and second unlicensed secondary cells being activated unlicensed secondary cells; and in a same secondary TAG. A measurement is made of a pathloss reference value for the second unlicensed secondary cell based on: a received signal power of the first unlicensed secondary cell; and a received signal power of the second unlicensed secondary cell. A determination is made whether a channel associated with the second unlicensed secondary cell is clear. Uplink transport blocks with a transmission power calculated employing the pathloss reference value is transmitted via the second unlicensed secondary cell.

20 Claims, 14 Drawing Sheets

Related U.S. Application Data

(60) Provisional application No. 62/289,042, filed on Jan. 29, 2016.

(51) Int. Cl.
*H04W 52/14* (2009.01)
*H04W 48/16* (2009.01)
*H04W 56/00* (2009.01)
*H04L 5/00* (2006.01)

(52) U.S. Cl.
CPC ....... *H04W 52/146* (2013.01); *H04W 56/001* (2013.01); *H04W 72/042* (2013.01); *H04W 72/0453* (2013.01); *H04W 72/0473* (2013.01)

(56) References Cited

U.S. PATENT DOCUMENTS

| | | |
|---|---|---|
| 2013/0188614 A1 | 7/2013 | Dinan |
| 2013/0258882 A1 | 10/2013 | Dinan |
| 2015/0146698 A1 | 5/2015 | Uchino et al. |
| 2015/0280873 A1 | 10/2015 | Luo et al. |
| 2016/0044600 A1* | 2/2016 | Kim ..................... H04W 76/15 455/127.1 |
| 2017/0141833 A1 | 5/2017 | Kim et al. |
| 2018/0048498 A1* | 2/2018 | Stern-Berkowitz ... H04W 16/14 |

OTHER PUBLICATIONS

3GPP TS 36.211 V13.0.0 (Dec. 2015); 3rd Generation Partnership Project; Technical Specification Group Radio Access Network; Evolved Universal Terrestrial Radio Access (E-UTRA); Physical channels and modulation(Release 13).

3GPP TS 36.212 V13.0.0 (Dec. 2015); 3rd Generation Partnership Project; Technical Specification Group Radio Access Network; Evolved Universal Terrestrial Radio Access (E-UTRA); Multiplexing and channel coding(Release 13).

3GPP TS 36.213 V13.0.1 (Jan. 2016); 3rd Generation Partnership Project; Technical Specification.

3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

3GPP TS 36.321 V13.0.0 (Dec. 2015); 3rd Generation Partnership Project; Technical Specification Group Radio Access Network; Evolved Universal Terrestrial Radio Access (E-UTRA); Medium Access Control (MAC) protocol specification (Release 13).

3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC);Protocol specification (Release 13).

* cited by examiner

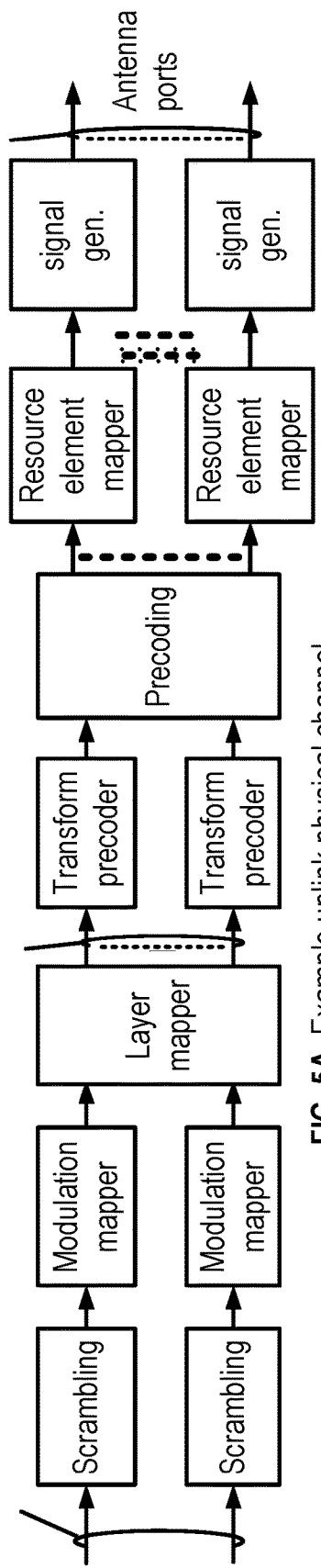
FIG. 5A Example uplink physical channel
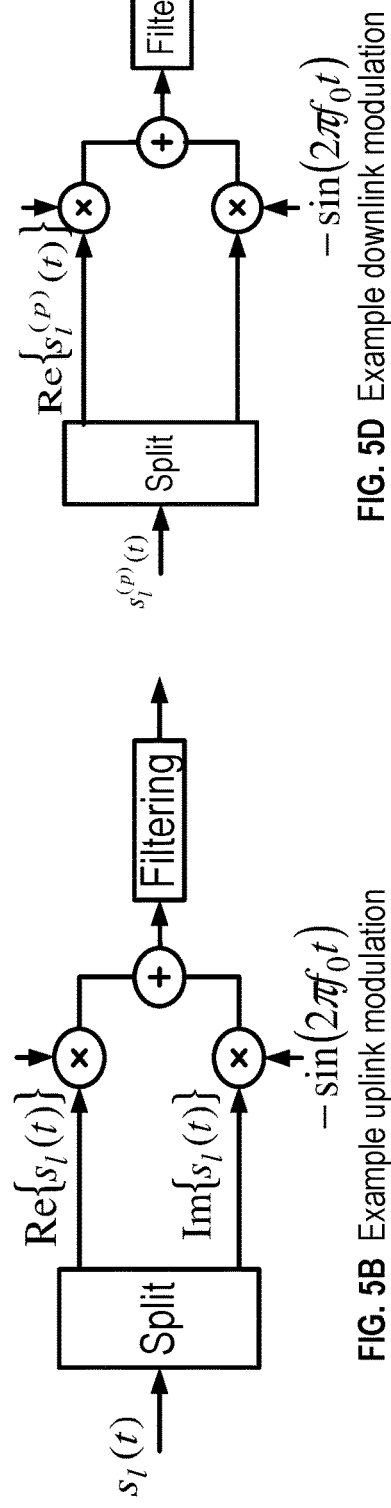
FIG. 5B Example uplink modulation
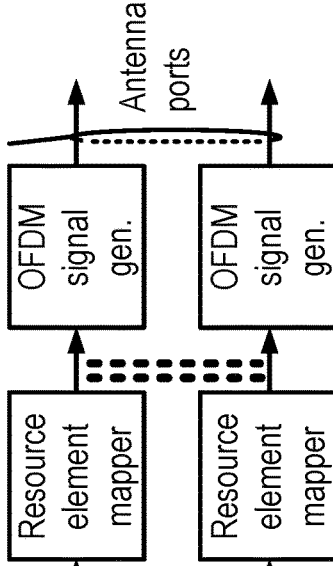
FIG. 5D Example downlink modulation
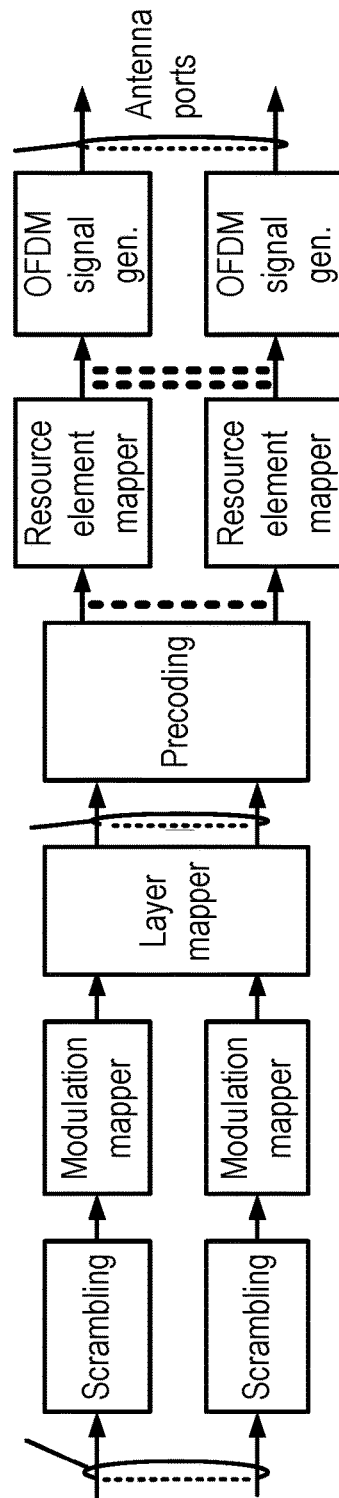
FIG. 5C Example downlink physical channel Dual-Connectivity at eNB FIG. 7 Dual-Connectivity- two MAC entities at UE side

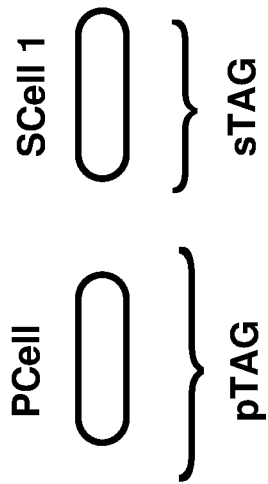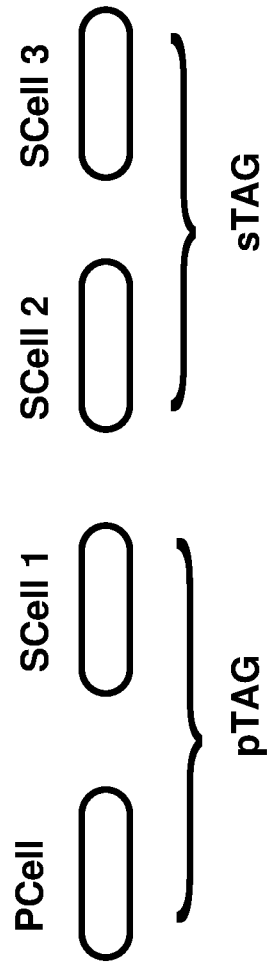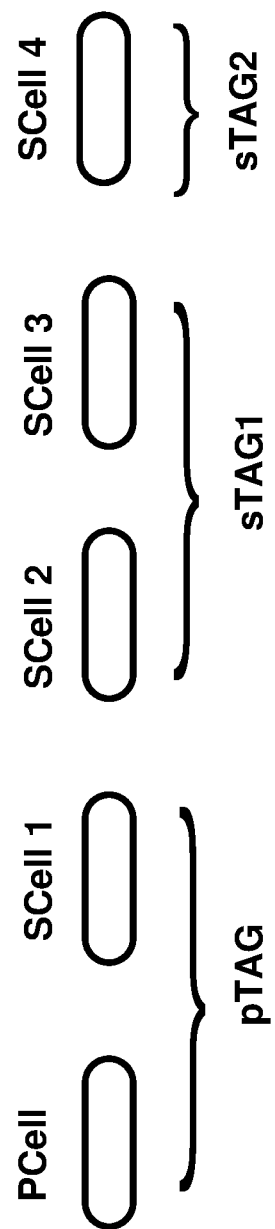
FIG. 8

FIRST AND SECOND UNLICENSED CELLS JOINTLY SERVING AS REFERENCE CELLS

CROSS-REFERENCE TO RELATED APPLICATIONS

This application is a continuation of U.S. patent application Ser. No. 15/417,796, filed Jan. 27, 2017, which claims the benefit of U.S. Provisional Application No. 62/289,042, filed Jan. 29, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
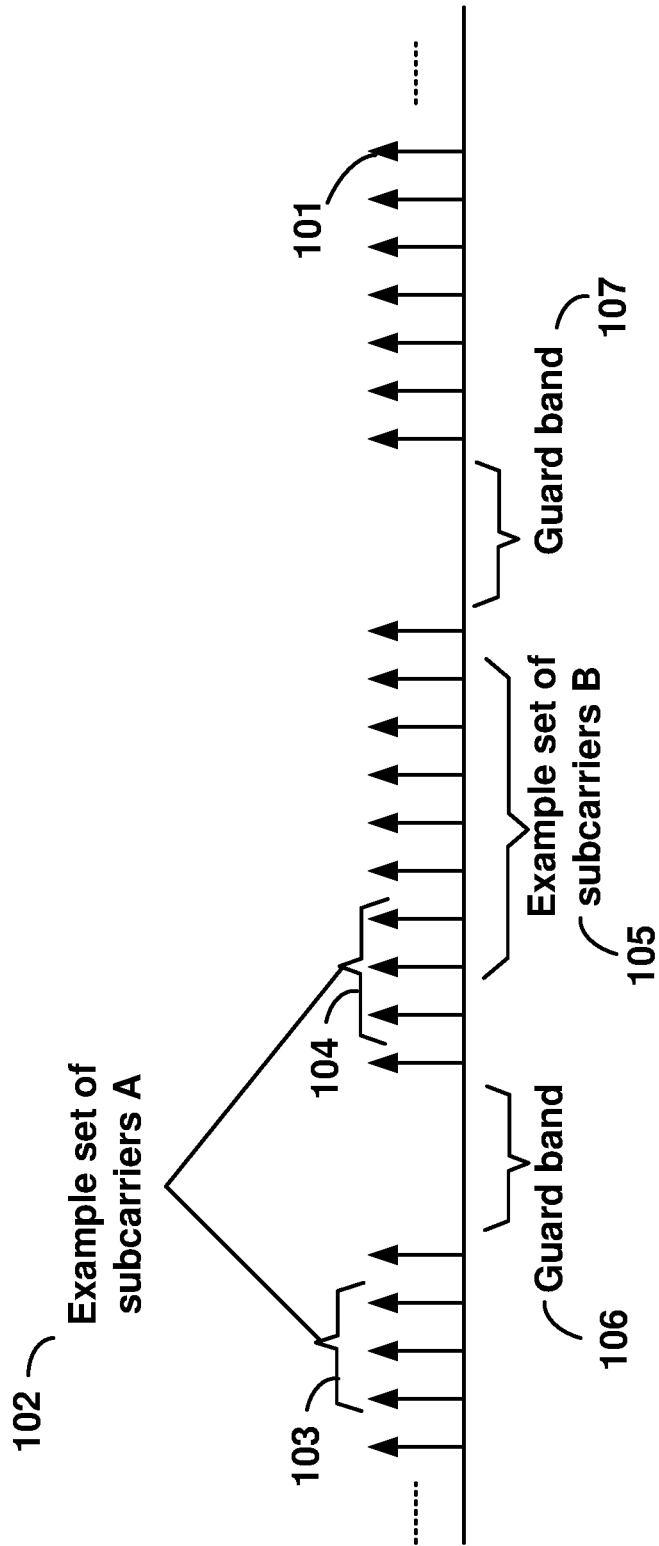
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
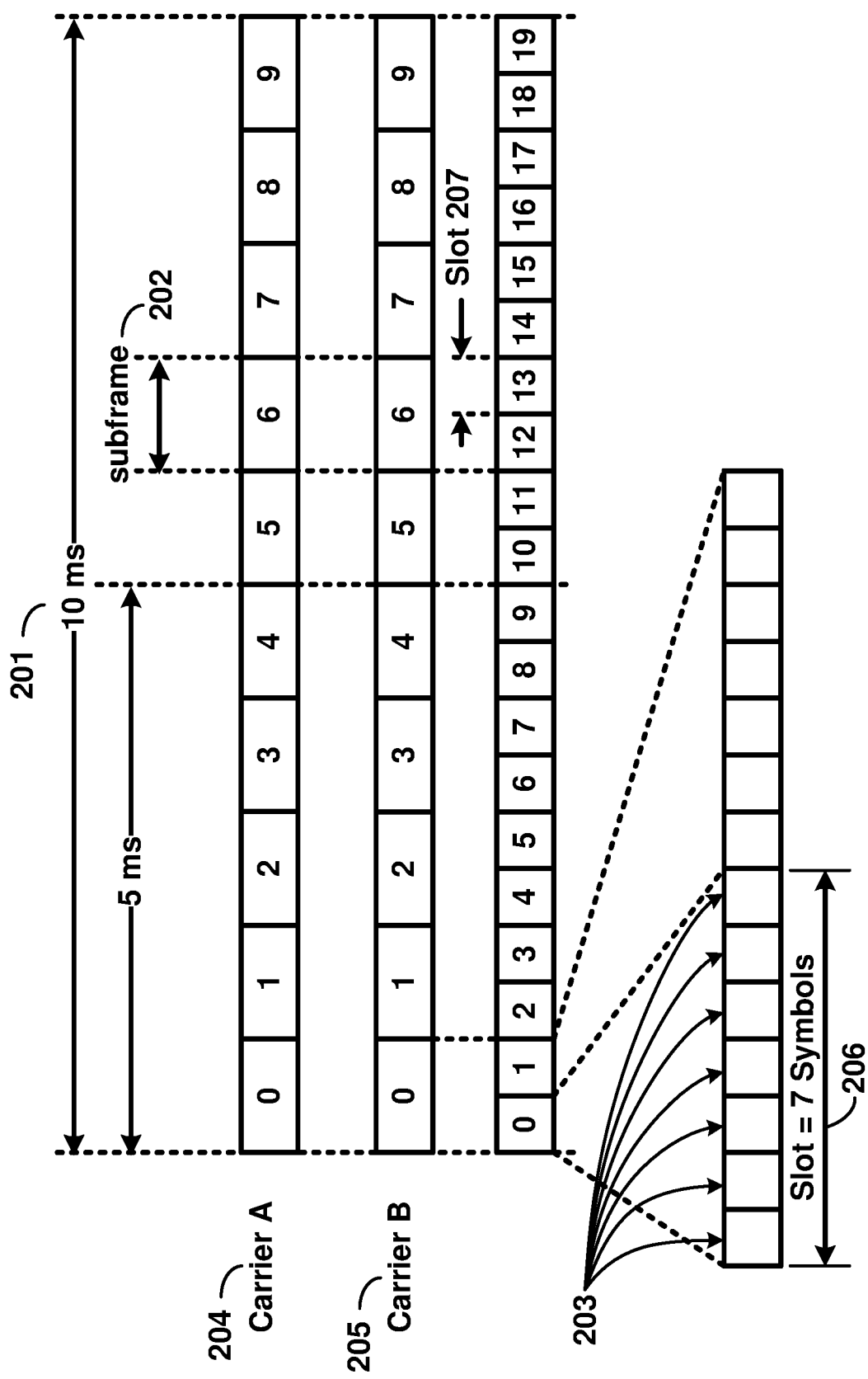
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
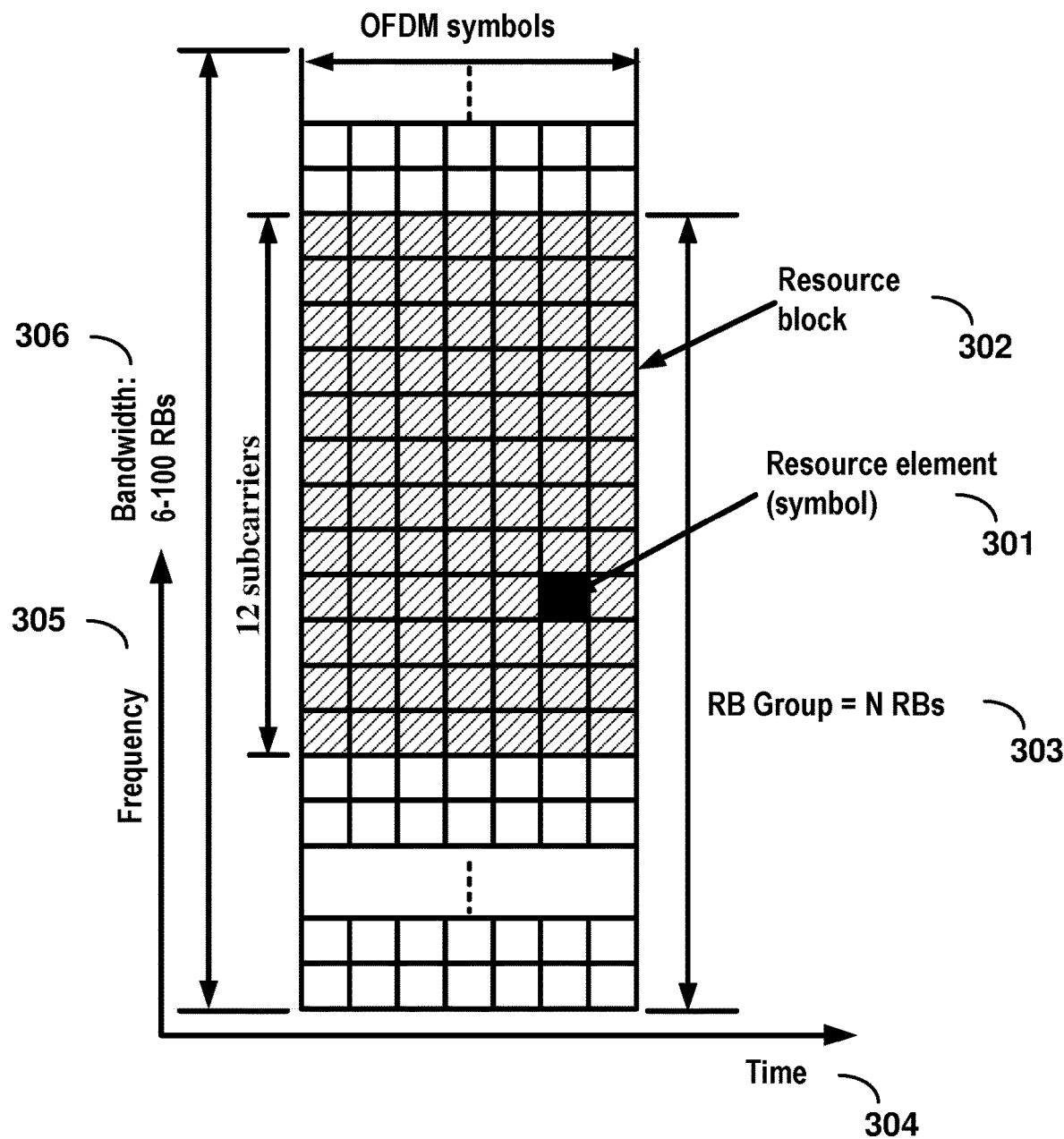
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
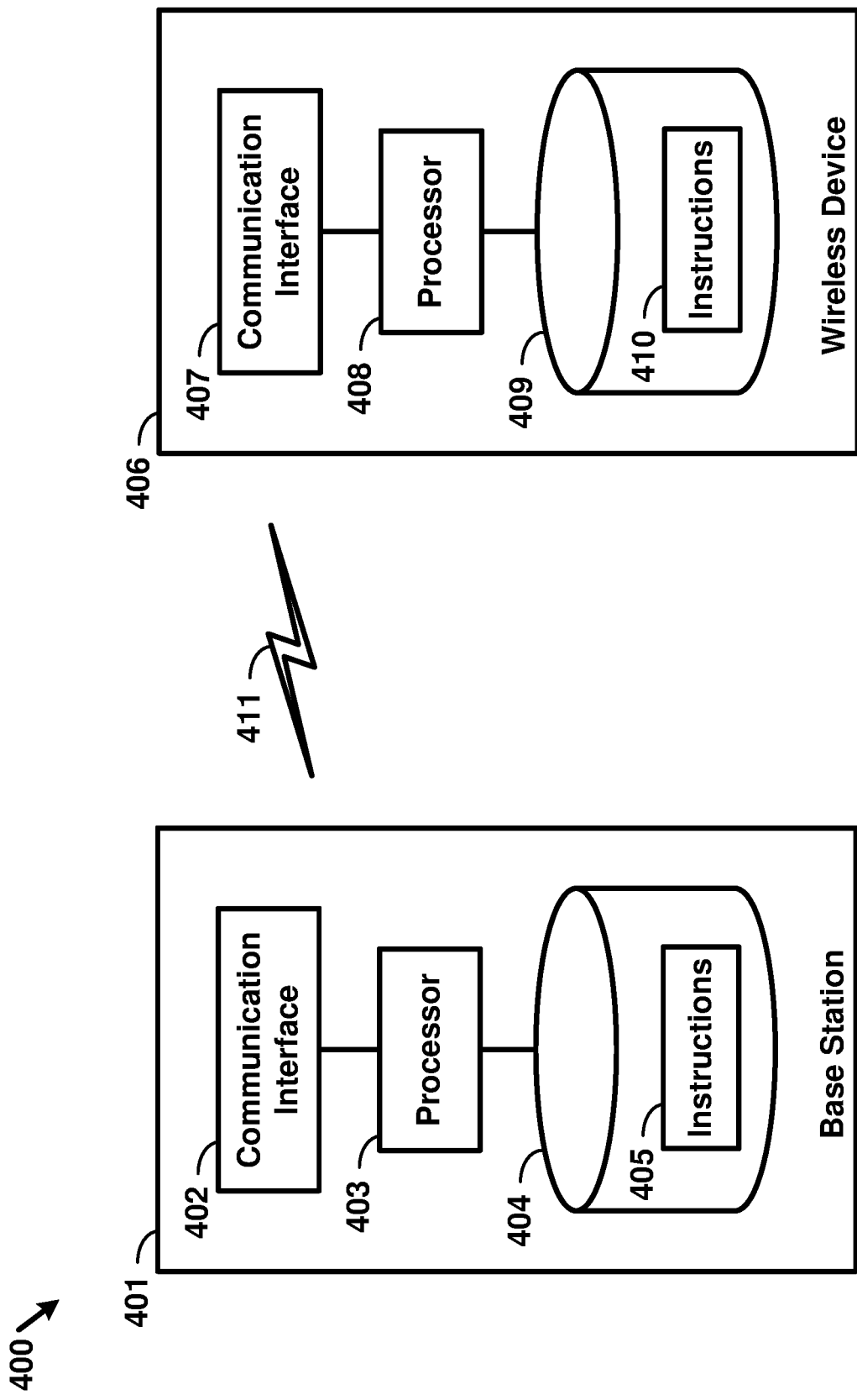
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
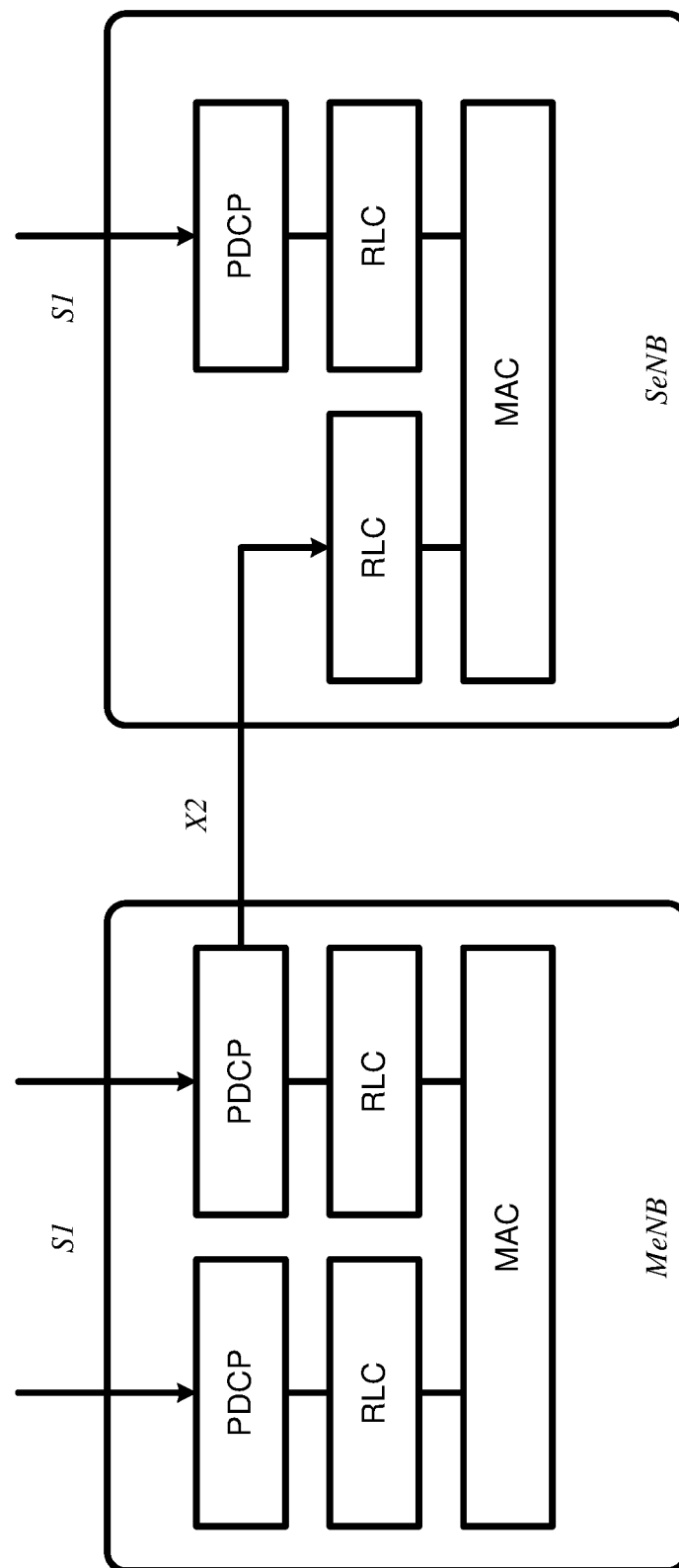
FIG. 6 is an example diagram for a protocol structure with CA and DC as per an aspect of an embodiment of the present disclosure.
Figure 7:
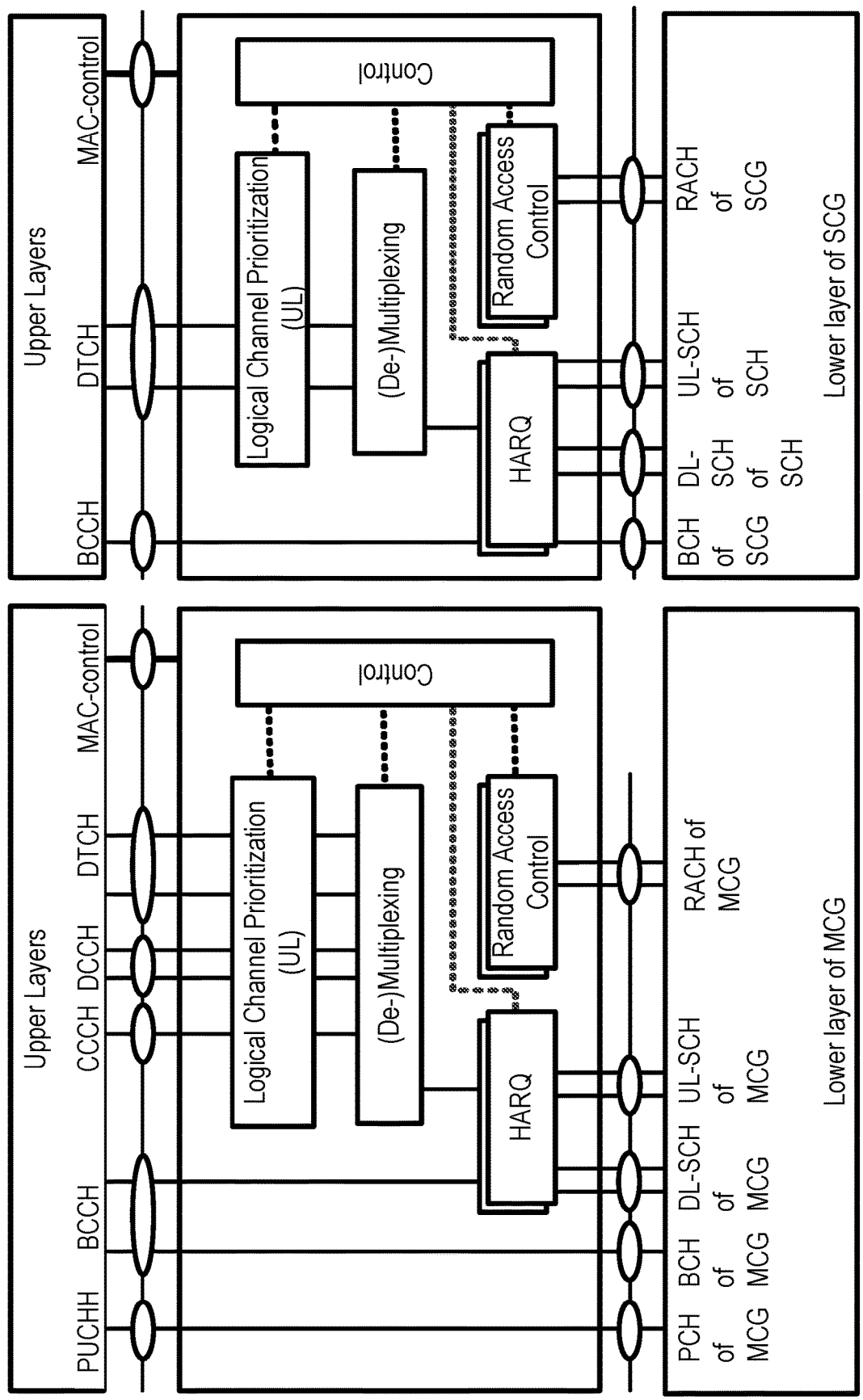
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
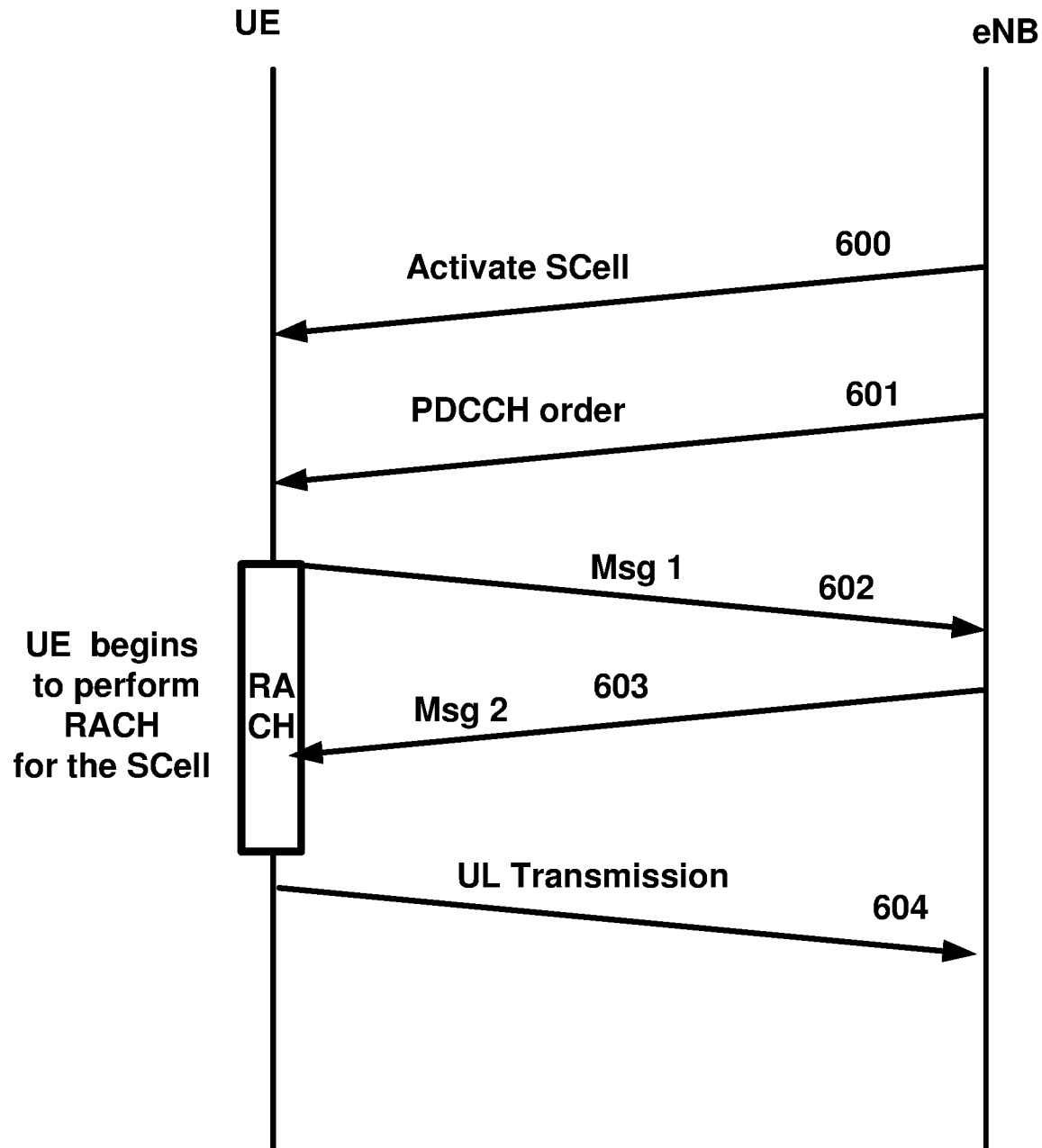
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602

(Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
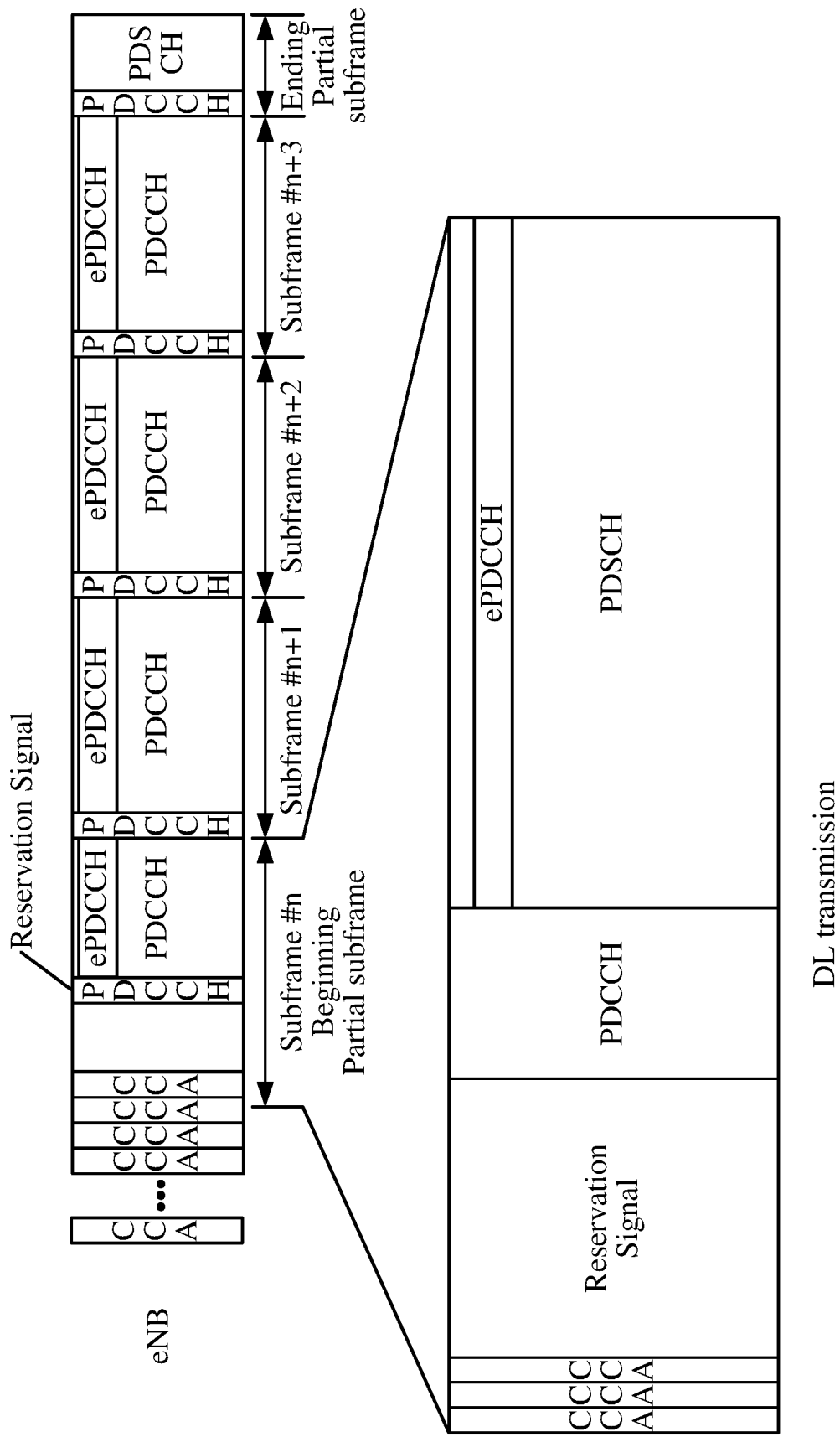
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

According to some of the various aspects of embodiments, a pathloss reference SCell may be used for uplink power control and/or transmission of random access preamble. A UE may measure downlink pathloss using a signal received on the pathloss reference cell. The pathloss reference downlink cell and the corresponding uplink cell may be configured to be in the same frequency band due to the required accuracy of pathloss estimation. In an example embodiment, cells of a given eNB are grouped in PUCCH cell groups. In another example embodiment cells of an eNB may be grouped according to different criteria, for example, frequency band, cell type, scheduling criteria, transmitter/receiver type/location, and/or other parameters. In an example embodiment, LAA cells (e.g. in the same band) may be grouped in a cell group. Example embodiment of the invention may implement a type of grouping to group cells associated with a given eNB. One or more cells employed for transmitting and receiving information to a given eNB may be grouped into one or more cell groups.

In an example embodiment, the pathloss reference downlink cell and the corresponding uplink cell may further require being in the same group depending on the network configuration. The current LTE standard may not support multiple groupings described here, and may not allow a flexible pathloss reference configuration within a group of a CG (MCG or SCG). In prior releases of LTE-A, pathloss reference may be configured as the downlink of the same SCell or the PCell in pTAG. In an sTAG, pathloss reference may be only configured as the downlink of the same SCell. This may not be an issue with LTE R.10/11/12/13 or before, but such configuration options may not be an efficient solution for LTE R.14 or above supporting uplink LAA cells. In LTE R.14 or above, high number of cells (higher than 5 and up to 32 cells), multiple licensed/unlicensed bands, and/or multiple PUCCH cell groups may be supported. This may introduce a new pathloss reference linking issue that is addressed here. The example embodiments introduced here introduce an enhancement to the current pathloss configuration, which could be applicable to LTE R.14 or above.

Explicitly configuring the pathloss reference downlink SCell within the same frequency band as the concerned uplink SCell may meet the requirement of measurement accuracy. This may be a flexible configuration to provide the pathloss reference for an uplink SCell. In an example implementation, the pathloss reference may be configured using the Pathloss Reference Linking parameter in Uplink Power Control Dedicated SCell Information Element (IE). This IE may be configured by eNB and be transmitted to the UE as a part of Physical Configuration Dedicated SCell IE when the SCell is configured or re-configured using RRC messages. An example list of parameters in Uplink Power Control Dedicated SCell IE is the following: UplinkPowerControlDedicatedSCell::=SEQUENCE {p0-UE-PUSCH, deltaMCS-Enabled, accumulationEnabled, pSRS-Offset, pSRS-OffsetAp, filterCoefficient, pathlossReferenceLinking}. Other example parameters may be employed.

According to some of the various aspects of embodiments, the pathloss reference may be explicitly indicated in terms of carrier index (or carrier index and/or group index) of the pathloss reference SCell. The parameter pathloss reference linking for a given SCell configuration may be set to the cell index (or carrier index and/or group index) for the pathloss reference. The path loss reference of an SCell may be different than the SCell, meaning a given SCell may be configured with a different SCell pathloss reference. For example, the pathloss reference of SCell 2 may be SCell 4. This may be a flexible way to configure pathloss reference. The cell index (or carrier index and/or group index) of an SCell is configured by the RRC layer and is communicated to eNB. This embodiment may introduce some overhead to maintain pathloss reference which is explicitly configured. It may also require support for a more complicated configuration in the UE.

In an example implementation, an eNB may configure one or more LAA cells in a group. In an example, the group may be an sTAG in TAG groupings, or may be a group in a different type of cell grouping. An eNB may transmit an RRC message to a UE and may comprise the group id of a cell group, or may associate a cell to a cell group using a group id.

In an example embodiment, RRC may configure the UE to autonomously select one of the SCells in a group of LAA cells as the pathloss reference. In an example embodiment, the UE may autonomously select a cell in the LAA cell group as the pathloss reference. The pathloss reference selected by the UE may be an activated SCell. The UE may autonomously change the pathloss reference when it is needed to be changed. This process may reduce battery power consumption in the UE, since the UE does not have to measure the downlink of each activated LAA SCell for pathloss measurement. In an example, a number of LAA cells in adjacent frequencies may be configured. The LAA cells may experience the same channel conditions. The transmit power on different LAA cells may be the same or different. In an example embodiment, the UE may be informed about the LAA cell transmit power of an eNB, and/or transmit power differences among a number of LAA cells of an eNB.

The UE may select a reference downlink SCell in an LAA cell group as the pathloss reference for SCells in the group. This implementation may provide increased efficiency in many scenarios. For example, when carriers in the same band require one pathloss reference cell and the same cell may be used as the pathloss reference. The cells in the same group may be in the same band and may experience the same pathloss behavior. This implementation may reduce the battery power consumption, since the UE may not have to monitor the path loss for each cell. This configuration may enhance efficiency when multiple carriers in the same group experience the same pathloss behavior. This may require monitoring one pathloss carrier for a cell group. If this configuration is applied to cell groups, then the number of monitored carrier pathloss may be equal to the number of cell groups.

According to an example embodiment, the choice of pathloss reference SCell may be selected from and be limited to the following options: a) the SIB2 linked downlink SCell of the uplink SCell, b) a reference downlink sCell in a group that the SCell belongs to. In an example embodiment, the Pathloss Reference Linking parameter may take one these alternative parameters and may be configured during the configuration of an SCell using RRC messages. This would limit possible UE configurations. It would also reduce the size of information transmitted to the UE in the RRC message. In an example embodiment, the reference downlink sCell may be autonomously selected by the UE. The UE may select an activated LAA SCell in the group as the pathloss reference. The UE may change the pathloss reference when it needs to. In an example, the UE may not change the pathloss reference frequently. For example, when the pathloss reference is deactivated and/or released, the UE may change the pathloss reference to a different LAA SCell. In an example, one SCell in a group may be selected as pathloss reference at a given time.

In an example embodiment, an eNB may configure one of the SCells as the main SCell in the group, and the UE may select the main SCell as the pathloss reference. According to some of the various aspects of embodiments, the choice of pathloss reference SCell may be selected from and be limited to the following two options: a) the SIB2 linked downlink SCell of the uplink SCell, b) reference downlink sCell in a group that the SCell belongs to. This may reduce the size of the information transmitted to the UE (one bit may be required for transmitting this information), it may also limit the possible configuration alternatives, and may simplify UE implementations. The first alternative in this embodiment (a in this paragraph) may require a higher UE power consumption. If a UE does not need to measure the pathloss on activated SIB2-linked DL cells, the second alternative (b in this paragraph) may be used and it may reduce UE power consumption. A UE may consider a different reference pathloss for cells in each cell group. In the second alternative, the UE would need to measure one downlink SCell for SCells belonging to a cell group. The current configuration options in LTE R.10/11/12/13 may need to be updated. In the current R.12/13 configuration, pathloss reference is configurable between PCell and SIB2-linked DL SCell (in pTAG).

The pathloss configuration may be communicated to the UE via RRC messages. In this configuration, the pathloss of the SCells belonging to the group including the primary cell may be the SIB2 downlink SCell of the SCell or the downlink PCell.

Figure 11:
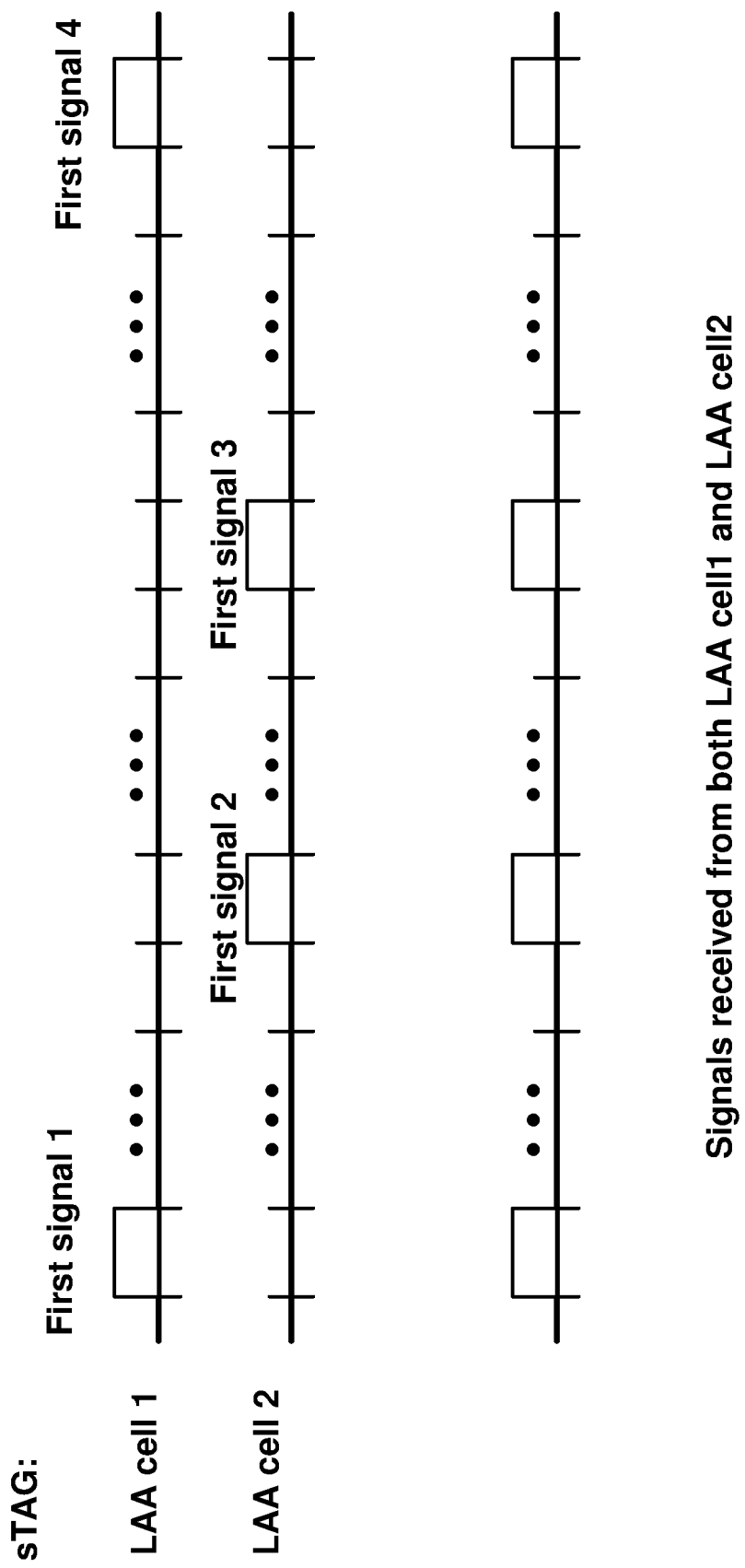
FIG. 11 is an example diagram depicting a plurality of cells as per an aspect of an embodiment of the present disclosure.

In an example embodiment, the UE may use a plurality of cells in a group as the downlink pathloss reference. FIG. 11 shows an example pathloss measurement mechanism for unlicensed cells. First signal may be, for example, synchronization signal, a type of reference signal, and/or discovery signal. First signal may be, for example, DS signal used for downlink synchronization. First signal may be employed by the UE for downlink synchronization and/or pathloss measurement of the received signal. First signal may be an initial signal or burst signal including frame, subframe and/or symbol timing information. First signal may be a downlink burst including timing information (e.g. initial signal, CRS, other types of RS, DRS, and/or other timing information). First signals transmitted by LAA cell 1 and LAA cell 2 may not have the same configuration and/or format. In an example, First signal 1 and first signal 4 transmitted on LAA Cell 1 may have different format or the same format. First signal may be employed for pathloss measurement. UE may obtain pathloss measurement from measurement of the received signal by processing the first signal. The pathloss measurement may be employed for uplink signal transmission.

Due to LBT, LAA cells may not be able to transmit the first signal in a given subframe, or a configured window of subframes. When first signal is not transmitted, UE may have difficulties measuring a pathloss reference. In an example embodiment, a UE may employ the first signals transmitted on LAA cell 1 and LAA cell 2 to measure the pathloss reference. FIG. 11 shows an example. When UE employs both first signals transmitted on LAA cell 1 and LAA cell 2, UE may receive and process more instances of the first signal for pathloss measurement of both LAA cell 1 and LAA cell 2. This mechanism may enhance the pathloss measurement process and accuracy.

Figure 12:
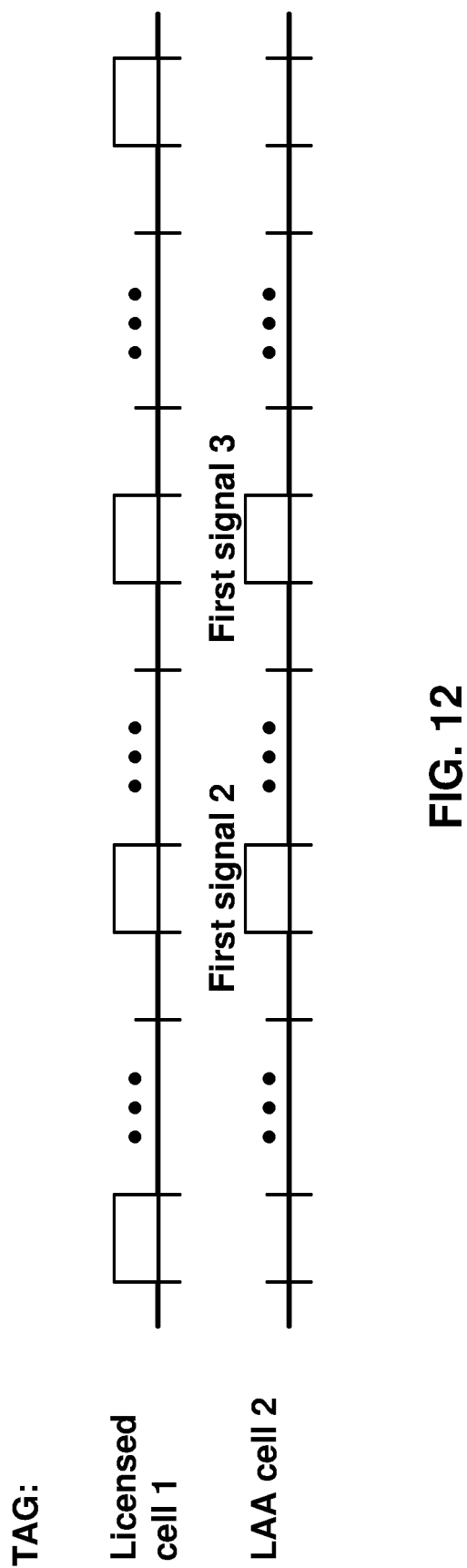
FIG. 12 is an example diagram depicting a plurality of cells as per an aspect of an embodiment of the present disclosure.

In an example embodiment, the first signal may be DS signal and/or synchronization signal and/or a reference signal. DS configuration may be the same or different on LAA cell 1 and LAA cell 2. In an example, the first signal may be initial signal, CRS, and/or downlink burst, or a combination of some of these signals. The first signal may include synchronization signal. The first signal may include CRS and/or CSI-RS signal. The first signal includes timing information of the downlink signal. In an example, one of or both of LAA cell 1 and LAA cell 2 may be configured with an uplink. FIG. 11 and FIG. 12 show two LAA cells, but the examples can be extended when more than two LAA cells and one or more cells are configured. FIG. 11 and FIG. 12 show two TAG groupings, but the examples may be extended when to a different type of grouping mechanism.

The join pathloss measurement mechanism illustrated in FIG. 11 may be implemented to further enhance pathloss measurement. For example, the downlink pathloss measurement may be for uplink power control purposes. In an example embodiment, cell 1 may employ signals of cell 2, and cell 2 may employ signals of cell 1 for downlink or uplink signal transmission. In an example embodiment, the joint cell measurement or downlink signal measurements may be employed for de-activated cells and/or for RRM purposes. In an example embodiment, the joint signal measurement may be employed for activated cells. The accuracy of the measurement may depend on the activation status of the cells. Example embodiment may be implemented in one or both cases depending on the implementation requirements. In an example, when an example embodiment is implemented for activated cells, signals received from inactivated cells may not be considered for joint measurement mechanism.

In an example embodiment, a wireless device may receive at least one control message comprising configuration parameters of a plurality of cells grouped into one or more cell groups. The plurality of cell groups may comprise a first cell group and a second cell group. The first cell group may comprise a first subset of the plurality of cells. Uplink transmission power in the first cell group may be derived employing a first cell in the first cell group. The second cell group may comprise a first unlicensed cell and a second unlicensed cell in the plurality of cells. Uplink transmission power in a cell of the second cell group may be derived employing at least a first signal received on the first unlicensed cell and a second signal received on the second unlicensed cell.

In legacy systems, when UE is configured with an sTAG, the UE may use the downlink of an SCell in the sTAG (as a reference cell) for deriving the UE transmit timing for cells in the sTAG. In an example embodiment, selecting a specific unlicensed cell for deriving measurement may not be a reliable choice and/or may increase battery power consumption. Signals transmitted by eNB on an unlicensed cell is subject to LBT. The UE may have to change its pathloss reference cell quite frequently if the pathloss reference cell is an unlicensed cell. This may result in measurement errors. In an enhanced mechanism, the UE may employ the signals of more than one cell as the reference signal for pathloss measurement purpose. This may reduce the probability of changing the reference cell and may improve the measurement mechanism. Signals of two or more cells are employed for determining downlink pathloss measurement and/or uplink transmission power. In an example embodiment, the two or more cells may be required to be activated cells. Uplink signals may be transmitted on activated cells. If the measurement mechanism is employed for deactivated status, the two or more cell may be activated or deactivated.

FIG. 12 shows a configuration wherein at least one licensed cell and at least one LAA cell are configured within the same group (e.g. a TAG, a pathloss group). In example embodiments, signal transmission in cell 1 is not subject to LBT, but signal transmission in cell 2 is subject to LBT. The UE may employ synchronization and/or reference signals received on cell 1 to measure pathloss for uplink transmissions on LAA cell2. Cell1 and Cell2 may be transmitted from the same transmission point. In an example embodiment, licensed cell 1 may be an activated cell (e.g. SCell).

Uplink power control may control the transmit power of the different uplink physical channels. For PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be split equally across the antenna ports on which the non-zero PUSCH is transmitted.

For PUCCH or SRS, the transmit power $\hat{P}_{PUSCH,c}(i)$, or $\hat{P}_{SRS,c}(i)$ may be split equally across the configured antenna ports for PUCCH or SRS. $\hat{P}_{SRS,c}(i)$ is the linear value of $P_{SRS,c}(i)$ For a serving cell with frame structure type 1, a UE may not be expected to be configured with UplinkPowerControlDedicated-v12x0.

In an example, the setting of the UE Transmit power for a Physical Uplink Shared Channel (PUSCH) transmission may be defined as follows. If the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]

In an example, if the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i)=\min\{P_{CMAX,c}(i), P_{O\_PUSCH,c}(1)+\alpha_c(1)\cdot PL_c+f_c(i)\}$ [dBm].

where, $P_{CMAX,c}(i)$ may be the configured UE transmit power in subframe i for serving cell c and $\hat{P}_{CMAX,c}(i)$ is the linear value of $P_{CMAX,c}(i)$. If the UE does not transmit PUCCH and PUSCH in subframe i for the serving cell c, for the accumulation of TPC command received with DCI format 3/3A for PUSCH, the UE may compute $P_{CMAX,c}(i)$ assuming MPR=0 dB, A-MPR=0 dB, P-MPR=0 dB and ☐TC=0 dB, where MPR, A-MPR, P-MPR and ☐TC. $\hat{P}_{PUCCH}(i)$ may be the linear value of $P_{PUCCH}(i)$. $M_{PUSCH,c}(i)$ may be the bandwidth of the PUSCH resource assignment expressed in number of resource blocks valid for subframe i and serving cell c. Parameters in the power control mechanism may be described in latest release of 3GPP TS 36.213 specifications. $PL_c$ may be the downlink path loss estimate calculated in the UE for serving cell c in dB and $PL_c$=referenceSignalPower–higher layer filtered RSRP, where referenceSignalPower is provided by higher layers for the reference serving cell and the higher layer filter configuration for the reference serving cell.

In an example, $\delta_{PUSCH,c}$ may be a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE may use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ are defined by: $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI. The value of $K_{PUSCH}$ may be predefined. $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers.

In an example, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i) \cdot \hat{P}_{PUSCHc}(i) \leq (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \leq w(i) \leq 1$. In case there is no PUCCH transmission in subframe i $\hat{P}_{PUCCH}(i)=0$.

In an example, if the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \neq j} w(i) \cdot \hat{P}_{PUSCH,c}(i) \leq \left(\hat{P}_{CMAX}(i) - \hat{P}_{PUSCH,j}(i)\right)$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling may be applied to $\hat{P}_{PUSCH,j}(i)$ unless $$\sum_{c \neq j} w(i) \cdot \hat{P}_{PUSCHc}(i) = 0$$

and the total transmit power of the UE still would exceed $\hat{P}_{CMAX}(i)$

For a UE not configured with a SCG or a PUCCH-SCell, w(i) values may be the same across serving cells when w(i)>0 but for certain serving cells w(i) may be zero.

In an example, if the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min\left(\hat{P}_{PUSCH,j}(i), \left(\hat{P}_{CMAX}(i) - \hat{P}_{PUCCH}(i)\right)\right) \text{ and}$$

$$\sum_{c \neq j} w(i) \cdot \hat{P}_{PUSCH,c}(i) \leq \left(\hat{P}_{CMAX}(i) - \hat{P}_{PUCCH} - \hat{P}_{PUSCH,j}(i)\right).$$

In an example, if serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c may be defined by $$P_{PUCCH}(i) = \min$$
$$\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{T \times D}(F') + g(i) \end{cases}$$
$$[dBm]$$

In an example, if serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min$$
$$\begin{cases} P_{CMAX,c}(i) \\ P_{0\_PUCCH} + PL_c + 10\log_{10}(M_{PUCCH,c}(i)) + \Delta_{TF,c}(i) + \Delta_{F\_PUCCH}(F) + g(i) \end{cases}$$
$$[dBm]$$

If the UE is not transmitting PUCCH for the primary cell, for the accumulation of TPC command for PUCCH, the UE may assume that the UE transmit power $P_{PUCCH}$ for PUCCH in subframe i is computed by $$P_{PUCCH}(i) = \min\{P_{CMAX,c}(i), P_{O\_PUCCH} + PL_c + g(i)\}$$
$$[dBm]$$

In an example, the setting of the UE Transmit power $P_{SRS}$ for the SRS transmitted on subframe i for serving cell c may be defined by $$P_{SRS,c}(i) = \min\{P_{CMAX,c}(i), P_{SRS\_OFFSET,c}(m)) + 10 \log_{10}$$
$$(M_{SRS,c}) + P_{O\_PUSCH,c}(i) + \alpha_c(i) \cdot PL_c + f_c(i)\}[dBm]$$

Where $P_{CMAX,c}(i)$ may be the configured UE transmit power in subframe i for serving cell c. $P_{SRS\_OFFSET,c}(m)$ may be semi-statically configured by higher layers for m=0 and m=1 for serving cell c. For SRS transmission given trigger type 0 then m=0 and for SRS transmission given trigger type 1 then m=1. $M_{SRS,c}$ may be the bandwidth of the SRS transmission in subframe i for serving cell c expressed in number of resource blocks. $f_c(i)$ may be the current PUSCH power control adjustment state for serving cell. $P_{O\_PUSCH,c}(j)$ and $\alpha_c(j)$ may be parameters as for subframe i, where j=1.

In an example, if the UE is not configured with an SCG or a PUCCH-SCell, and if the total transmit power of the UE for the Sounding Reference Symbol in an SC-FDMA symbol would exceed $\hat{P}_{CMAX}(i)$, the UE may scale $\hat{P}_{SRS,c}(i)$ for the serving cell c and the SC-FDMA symbol in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ in subframe i and w(i) is a scaling factor of $\hat{P}_{SRS,c}(i)$ for serving cell c where 0<w(i)≤1. In an example, in an enhanced SRS procedures some of the SRS signals may be prioritized over some other SRS signals. In an example, some of the SRS signals may be dropped or scaled according to an SRS priority mechanism in example embodiments.

In an example, if the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and a of the overlapped SRS SC-FDMA symbols in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ in subframe i and w(i) is a scaling factor of $\hat{P}_{SRS,c}(i)$ for serving cell c where 0<w(i)≤1. In an example, in an enhanced SRS procedures some of the SRS signals may be prioritized over some other SRS signals. In an example, some of the SRS signals may be dropped or scaled according to an SRS priority mechanism in example embodiments.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE may use $f_{c,2}(i)$ instead of $f_c(i)$ to determine $P_{SRS,c}$ (i) for subframe i and serving cell c.

In an example, a UE may transmit Sounding Reference Symbol (SRS) on per serving cell SRS resources based on two trigger types: trigger type 0: e.g. higher layer signalling and/or trigger type 1: e.g. DCI formats 0/4/1A for FDD and TDD and DCI formats 2B/2C/2D for TDD. In case both trigger type 0 and trigger type 1 SRS transmissions would occur in the same subframe in the same serving cell, the UE may only transmit the trigger type 1 SRS transmission.

A UE may be configured with SRS parameters for trigger type 0 and trigger type 1 on a serving cell. One or more of the following SRS parameters may be serving cell specific and semi-statically configurable by higher layers for trigger type 0 and for trigger type 1: Number of combs $K_{TC}$ for trigger type 0 and a configuration of trigger type 1, if configured; Transmission comb $\bar{k}_{TC}$, for trigger type 0 and a configuration of trigger type 1; Starting physical resource block assignment $n_{RRC}$ for trigger type and a configuration of trigger type 1; duration: single or indefinite (until disabled), for trigger type 0; srs-ConfigIndex ISRS for SRS periodicity $T_{SRS}$ and SRS subframe offset $T_{offset}$, for trigger type 0 and SRS periodicity $T_{SRS,1}$ and SRS subframe offset $T_{offset,1}$, for trigger type 1; SRS bandwidth $B_{SRS}$, for trigger type 0 and a configuration of trigger type 1; Frequency hopping bandwidth, $b_{hop}$ for trigger type 0; Cyclic shift $n_{SRS}^{cs}$, for trigger type 0 and a configuration of trigger type 1; and Number of antenna ports $N_p$ for trigger type 0 and a configuration of trigger type 1.

According to various embodiments, the wireless device may comprise one or more processors and memory. The memory may store instructions that, when executed by the one or more processors, cause the wireless device to perform a series of actions. Embodiments of example actions are illustrated in the accompanying figures and specification.

Figure 13:
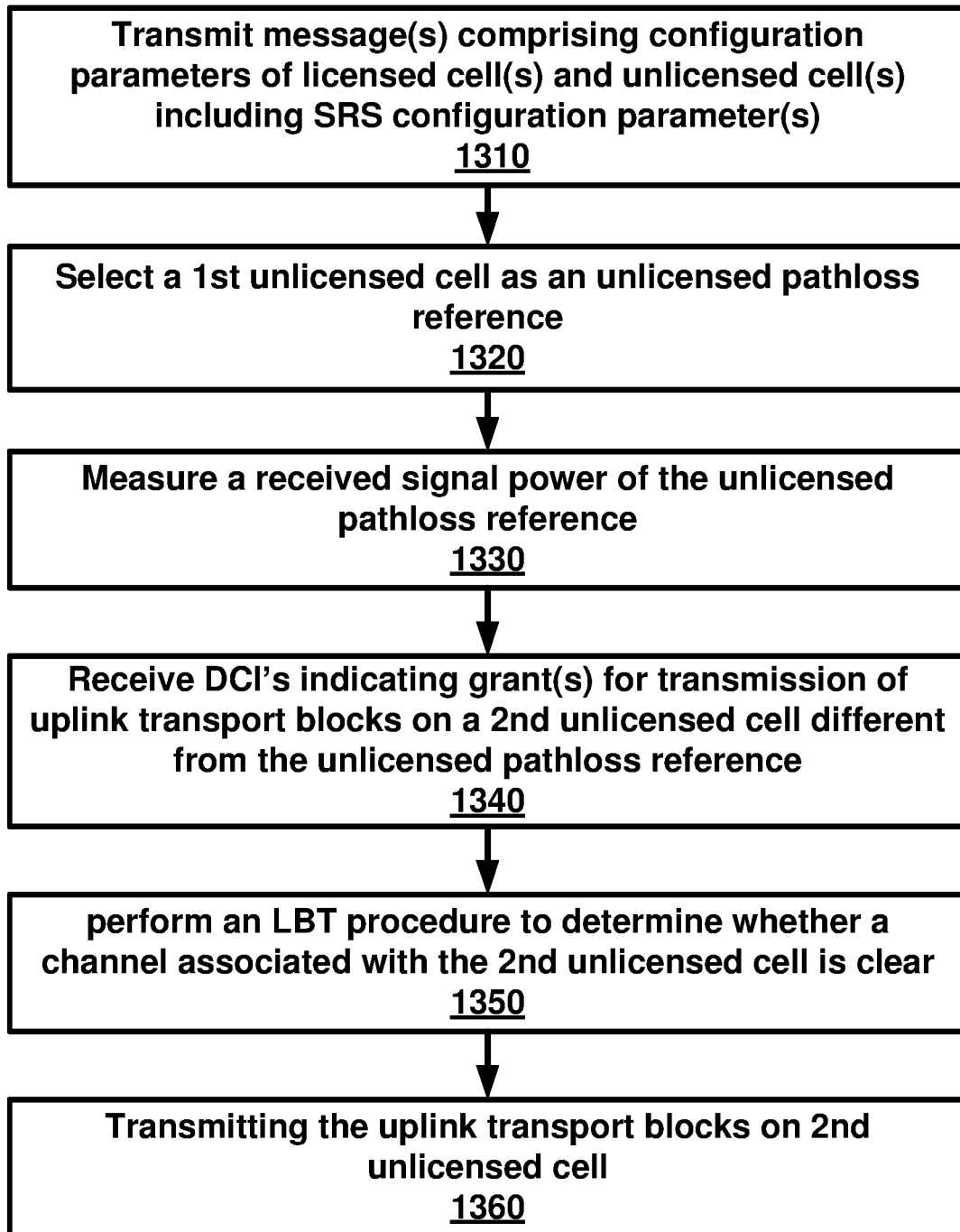
FIG. 13 is an example flow diagram as per an aspect of an embodiment of the present disclosure.

FIG. 13 is an example flow diagram as per an aspect of an embodiment of the present disclosure. At 1310, a wireless device may transmit one or more messages. The one or more messages may comprise configuration parameters of at least one licensed cell and a plurality of unlicensed cells. A first unlicensed cell of the plurality of unlicensed cells may be selected at 1320 as an unlicensed pathloss reference. A received signal power of the unlicensed pathloss reference may be measured at 1330. At 1340, the wireless device may receive a plurality of downlink control information (DCI) indicating a plurality of grants for transmission of uplink transport blocks on a second unlicensed cell different from the first unlicensed cell. A listen before talk procedure may be performed at 1350 to determine whether a channel associated with the second unlicensed cell is clear. The uplink transport blocks may be transmitted on the second unlicensed cell at 1360.

According to an embodiment, the transmission power of the uplink transport blocks on the second unlicensed cell may be calculated employing the received signal power of the unlicensed pathloss reference. The second unlicensed cell may, for example, comprise a second uplink unlicensed cell and a second downlink unlicensed cell. According to an embodiment, the unlicensed pathloss reference and the second unlicensed cell may be secondary cells. The unlicensed pathloss reference and the second unlicensed cell may be, for example, in a same frequency band. The wireless device may further change the unlicensed pathloss reference by selecting a third unlicensed cell as the unlicensed pathloss reference when one or more criteria is met. The one or more messages may comprise, for example, dedicated uplink power control parameters. The one or more messages may comprise, for example, a transmit power of the first unlicensed cell.

Figure 14:
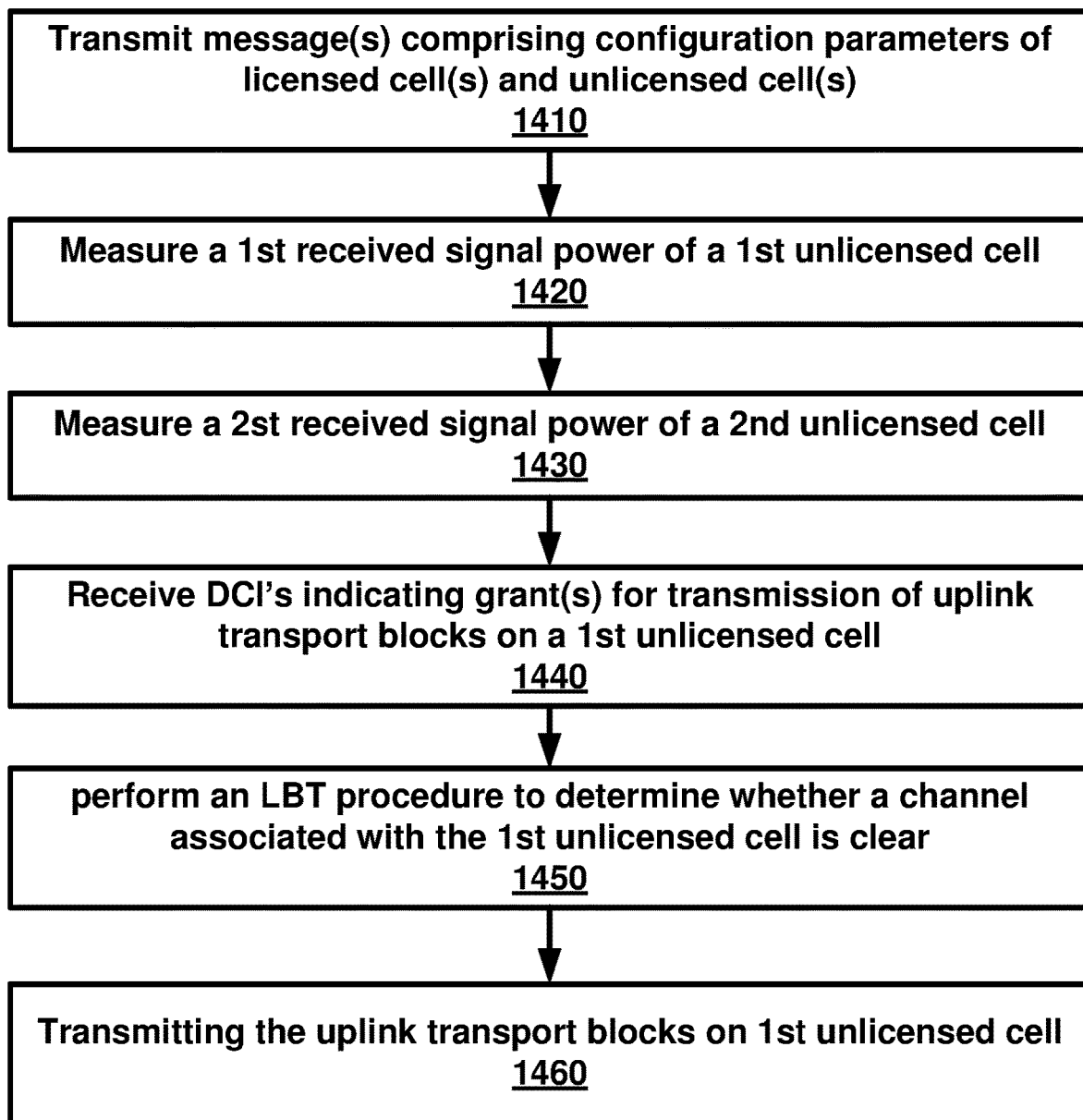
FIG. 14 is an example flow diagram as per an aspect of an embodiment of the present disclosure.

FIG. 14 is an example flow diagram as per an aspect of an embodiment of the present disclosure. At 1410, a wireless device may transmit one or more messages comprising configuration parameters of at least one licensed cell and a plurality of unlicensed cells. The plurality of unlicensed cells may comprise a first unlicensed cell and a second unlicensed cell. A first received signal power of the first unlicensed cell and a second received signal power of the second unlicensed cell may be measured at 1420 and 1430. At 1440, the wireless device may receive a plurality of DCIs indicating a plurality of grants for transmission of uplink transport blocks on the first unlicensed cell. A listen before talk procedure may be performed at 1450 to determine whether a channel associated with the first unlicensed cell is clear. The uplink transport blocks may be transmitted on the first unlicensed cell at 1460. A transmission power of the uplink transport blocks on the first unlicensed cell may be calculated employing, at least, the first received signal power and the second received signal power.

According to an embodiment, the first received signal and the second received signal may be one of the following: a synchronization signal; a discovery signal; or a reference signal. The one or more messages may comprise, for example, dedicated uplink power control parameters. The one or more messages may comprise, for example, a first transmit power parameter of the first unlicensed cell and a second transmit power parameter of the second unlicensed cell. According to an embodiment, the first unlicensed cell may comprise, for example, a first uplink unlicensed cell and a first downlink unlicensed cell. The first unlicensed cell and the second unlicensed cell may be, for example, in the same cell group.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving configuration parameters of:
at least one licensed primary cell of a primary timing advance group (TAG); and
a first and a second unlicensed secondary cells, of a secondary TAG, that are different cells; and
selecting both the first and second unlicensed secondary cells to jointly serve as reference cells for pathloss measurement of the second unlicensed secondary cell, wherein the selecting is based on the first and second unlicensed secondary cells being:
activated unlicensed secondary cells; and
in a same secondary TAG;
determining a pathloss reference value for the second unlicensed secondary cell based on a joint measurement of:
a received signal power of the first unlicensed secondary cell; and
a received signal power of the second unlicensed secondary cell;
determining whether a channel associated with the second unlicensed secondary cell is clear; and
transmitting, via the second unlicensed secondary cell, uplink transport blocks with a transmission power calculated employing the pathloss reference value.

2. The method of claim 1, wherein the second unlicensed secondary cell comprises a second uplink unlicensed cell and a second downlink unlicensed cell.

3. The method of claim 2, wherein the first unlicensed secondary cell and the second unlicensed secondary cell are in a same frequency band.

4. The method of claim 3, further comprising measuring the pathloss reference value based on a third unlicensed cell.

5. The method of claim 4, further comprising receiving dedicated uplink power control parameters.

6. The method of claim 5, further comprising receiving a transmit power of the first unlicensed secondary cell.

7. The method of claim 1, wherein the first unlicensed secondary cell and the second unlicensed secondary cell are in a same frequency band.

8. The method of claim 1, further comprising measuring the pathloss reference value based on a third unlicensed cell.

9. The method of claim 1, further comprising receiving dedicated uplink power control parameters.

10. The method of claim 1, further comprising receiving a transmit power of the first unlicensed secondary cell.

11. A wireless device comprising:
one or more processors; and
memory storing instructions that, when executed by the one or more processors, cause the wireless device to:
receive configuration parameters of:
at least one licensed primary cell of a primary timing advance group (TAG); and
a first and a second unlicensed secondary cells, of a secondary TAG, that are different cells; and
select both the first and second unlicensed secondary cells to jointly serve as reference cells for pathloss measurement of the second unlicensed secondary cell, wherein the selection is based on the first and second unlicensed secondary cells being:
  activated unlicensed secondary cells; and
  in a same secondary TAG;
determine a pathloss reference value for the second unlicensed secondary cell based on a joint measurement of:
  a received signal power of the first unlicensed secondary cell; and
  a received signal power of the second unlicensed secondary cell;
determine whether a channel associated with the second unlicensed secondary cell is clear; and
transmit, via the second unlicensed secondary cell, uplink transport blocks with a transmission power calculated employing the pathloss reference value.

12. The wireless device of claim 11, wherein the second unlicensed secondary cell comprises a second uplink unlicensed cell and a second downlink unlicensed cell.

13. The wireless device of claim 12, wherein the first unlicensed secondary cell and the second unlicensed secondary cell are in a same frequency band.

14. The wireless device of claim 13, wherein the instructions, when executed by the one or more processors, further cause the wireless device to measure the pathloss reference value based on a third unlicensed cell.

15. The wireless device of claim 14, wherein the instructions, when executed by the one or more processors, further cause the wireless device to receive dedicated uplink power control parameters.

16. The wireless device of claim 11, wherein the first unlicensed secondary cell and the second unlicensed secondary cell are in a same frequency band.

17. The wireless device of claim 11, wherein the instructions, when executed by the one or more processors, further cause the wireless device to measure the pathloss reference value based on a third unlicensed cell.

18. The wireless device of claim 11, wherein the instructions, when executed by the one or more processors, further cause the wireless device to receive dedicated uplink power control parameters.

19. The wireless device of claim 11, wherein the instructions, when executed by the one or more processors, further cause the wireless device to receive a transmit power of the first unlicensed secondary cell.

20. A system comprising:
a base station comprising:
  one or more first processors; and
  first memory storing first instructions that, when executed by the one or more first processors, cause the base station to transmit configuration parameters of:
    at least one licensed primary cell of a primary timing advance group (TAG); and
    a first and a second unlicensed secondary cells, of a secondary TAG, that are different cells; and
a wireless device comprising:
  one or more second processors; and
  second memory storing second instructions that, when executed by the one or more second processors, cause the wireless device to:
    receive the configuration parameters; and
    select both the first and second unlicensed secondary cells to jointly serve as reference cells for pathloss measurement of the second unlicensed secondary cell, wherein the selection is based on the first and second unlicensed secondary cells being:
      activated unlicensed secondary cells; and
      in a same secondary TAG;
    determine a pathloss reference value for the second unlicensed secondary cell based on a joint measurement of:
      a received signal power of the first unlicensed secondary cell; and
      a received signal power of the second unlicensed secondary cell;
    determine whether a channel associated with the second unlicensed secondary cell is clear; and
    transmit, via the second unlicensed secondary cell, uplink transport blocks with a transmission power calculated employing the pathloss reference value.

* * * * *